(12) United States Patent
Wong et al.

(10) Patent No.: US 6,581,074 B1
(45) Date of Patent: Jun. 17, 2003

(54) DIRECTORY SYNCHRONIZATION

(75) Inventors: Felix W. Wong, Bellevue, WA (US); Srinivasan Chandrasekar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 09/684,753

(22) Filed: Oct. 6, 2000

(51) Int. Cl.[7] .............................................. G06F 17/30
(52) U.S. Cl. ...................... 707/201; 707/203; 707/204
(58) Field of Search ................................ 709/223, 236, 709/248, 246; 707/10, 204, 201, 205, 203

(56) References Cited

U.S. PATENT DOCUMENTS 5,765,172 A * 6/1998 Fox .............................. 707/204
6,061,740 A * 5/2000 Ferguson et al. ............ 709/246

OTHER PUBLICATIONS

Synchronicity White Paper: Solutions for Seamless Integration of Multi-Vendor Networks, NetVision, 1997.

* cited by examiner

Primary Examiner—Jean M. Corrielus
Assistant Examiner—Gwen Liang
(74) Attorney, Agent, or Firm—Lee & Hayes, PLLC

(57) ABSTRACT

Directory synchronization is disclosed. A synchronization logic synchronizes a first directory and a second directory. The logic has one or more synchronization capabilities: a dampening capability, an identifier mapping capability, and a checksum capability. The dampening capability prevents changes that originate from the second directory that have already been synchronized to the first directory from being synchronized back to the second directory. The identifier mapping capability uses a table that maps a unique identifier of each record of the first directory with a unique identifier of a corresponding record of the second directory. Records that are moved within a directory can then be located. The checksum capability uses a checksum for each record in one of the directories, to efficiently detect changes.

20 Claims, 12 Drawing Sheets

DIRECTORY SYNCHRONIZATION

FIELD OF THE INVENTION

This invention relates generally to directories, and more particularly to the synchronization of information within such directories.

BACKGROUND OF THE INVENTION

Directories, also refereed to as directory services, catalog the names, profile information, and machine addresses of every user and resource on a network. User accounts, and network permissions, can be managed by using a directory. For example, the attributes for specific user names can be looked up, such as telephone numbers, an email addresses, and other attributes. Directories are generally specialized databases that are typically hierarchical in design, and provide fast lookups.

Companies may have more than one type of directory to manage their networks. For example, a company may use Novell Directory Services (NDS), which is available from Novell, Inc., as well as Active Directory (AD), which is available from Microsoft Corp., Inc. Different types of directories usually store information in different ways, and have different types of management tools to add, delete, and change information in the directories. To ensure that the information in one directory is consistent with another directory, network administrators typically have to make changes in both directories. This is a time-consuming and laborious process.

For this and other reasons, there is a need for the present invention.

SUMMARY OF THE INVENTION

The invention relates to directory synchronization. A synchronization logic synchronizes a first directory and a second directory. The logic has one or more of the following synchronization capabilities: a dampening capability, an identifier mapping capability, and a checksum capability. The dampening capability prevents changes that originate from the second directory and that have already been synchronized to the first directory from being synchronized back to the second directory. The identifier mapping capability uses a table that maps a unique identifier of each record of the first directory with a unique identifier of a corresponding record of the second directory, and vice-versa. Records that are moved within a directory can then be located. The checksum capability uses a checksum for each record in one of the directories, to detect changes, where this directory otherwise has no mechanism for efficiently detecting changes.

The dampening capability in particular uses an update sequence number capability of the first directory. A unique and consecutively incremented update sequence number is associated with each change in the first directory. When changes are synchronized from the second directory to the first directory, dampening information is recorded. The dampening information includes the update sequence numbers. When the first directory is then synchronized to the second directory, only non-dampened changes are sent to the second directory. The changes that were synchronized from the second directory to the first directory are not sent back from the first directory to the second directory because they are dampened.

Another aspect of the invention is that update sequence numbers (USN's) are also tracked to ensure that changes to the first directory have a higher priority than changes to the second directory. When a change in a record in the second directory is being synchronized to the corresponding record in first directory, it is only synchronized if there is not a newer change to the corresponding record in the first directory. This is accomplished by comparing the appropriate USN's, such that if newer changes are detected in the first directory, the change to the record in the second directory is not made to the corresponding record in the first directory. Note that the first directory having a higher priority than the second directory is a design decision. Alternatively, the second directory can have a higher priority than the first directory.

The identifier mapping capability is used in particular in situations where a record has been moved within a directory. For example, a particular record in North American sales may need synchronization from the first directory to the second directory. However, in the meantime, this record may have been moved in the second directory from North American sales to European marketing, and may not be able to be located via its distinguished name. The distinguished name is constructed from the name of record and the directory within which it is located. For example, the record may originally have the distinguished name of "North America/Sales/Record Name." After it is moved, the record may have the distinguished name of "Europe/Marketing/Record Name." Therefore, to locate this record in the second directory as corresponding to the record in the first directory, the identifier mapping table is used. The table maps a unique identifier of the record in the first directory with a corresponding unique identifier of the record in the second directory. Even if the records are moved within their respective directories, they can still easily be located through the mapping table, and moved as necessary.

The identifier mapping logic can also include a delete logic. For example, a mapping from the first directory to the second directory may show that records A, B, C, and D in the first directory are mapped to records 1, 2, 3, and 4 in the second directory, respectively. After reading the mapping, the second directory is then examined, which shows that the second directory only has records 1, 2, and 4. This means that record 3 in the second directory has been deleted, such that the corresponding record in the first directory, record C, may also be deleted when synchronizing from the second directory to the first directory.

The checksum capability is used in particular with a directory that does not have a mechanism for efficiently detecting changes in its records. For example, whereas the first directory may have the update sequence number capability to detect changes efficiently, the second directory may have no such capability, or have a limited capability. The limited capability may be inadequate, difficult to use, and not robust. For example, the second directory may have a time stamp capability, where each change has a time stamp associated therewith. However, time stamps cannot be used to detect deleted records. Furthermore, if the system time is changed, then the time stamps may yield inaccurate results. Therefore, the checksum capability is used to detect changes in the second directory. To detect changes in the second directory, a new checksum is determined for each record, which is compared with a previously determined and stored checksum for the record. If the new checksum is different from the stored checksum, this means that the record has changed. The checksum can be determined by using the values from all the attributes of a record. For a given set of values, the checksum is always the same. The checksum changes only if any of the attributes change.

Methods, systems, and synchronization logics of varying scope are encompassed by the invention. Other aspects, embodiments and advantages of the invention, beyond those described here, will become apparent by reading the detailed description and by referencing the drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Overview

Figure 1:
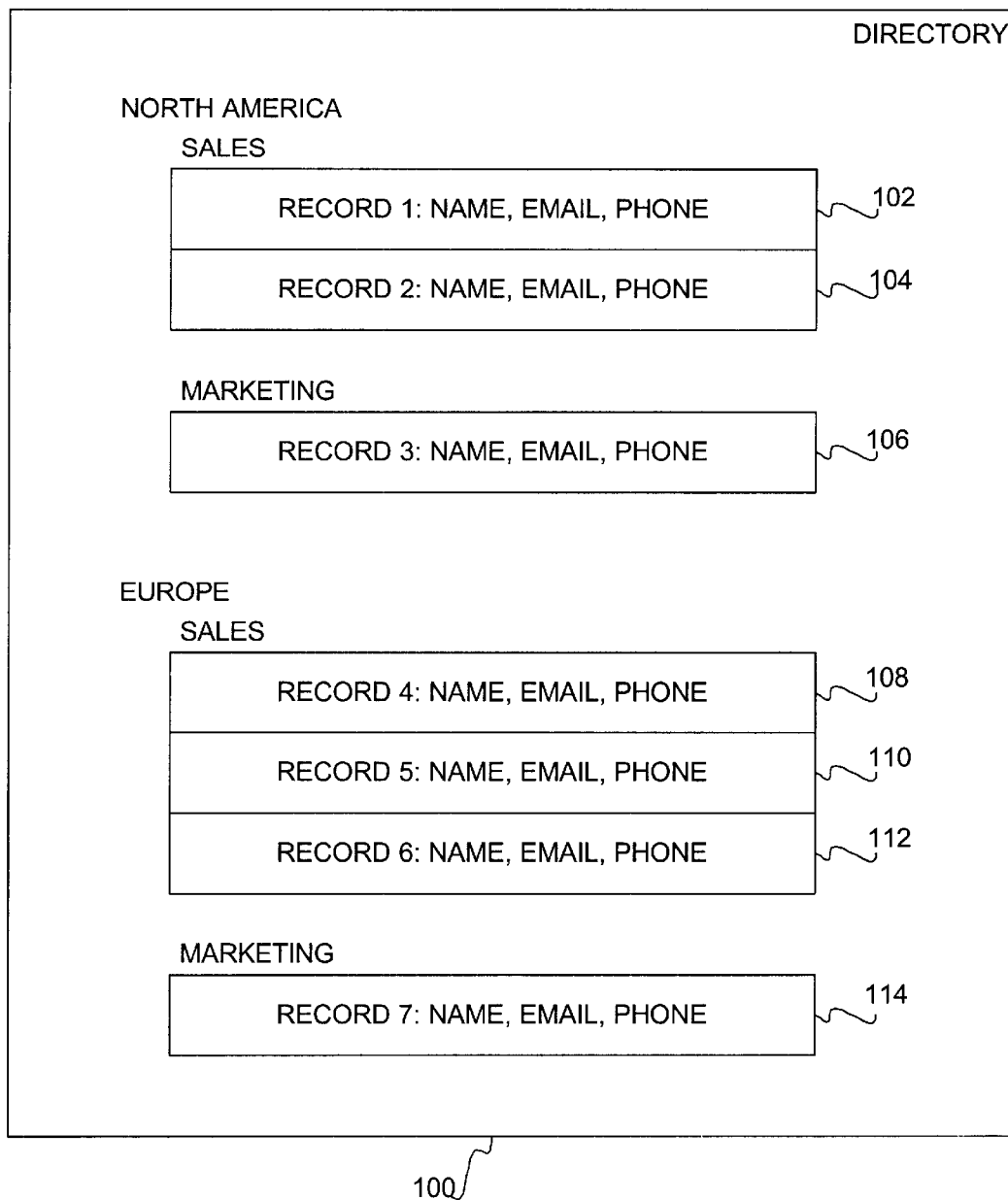
FIG. 1 is a diagram of an example directory.

FIG. 1 is a diagram of an example directory 100. The directory 100 catalogs the names, profile information, machine addresses, or other information, of every user and resource on a network. User accounts and network permissions can be managed through the directory 200. The directory 100 can be a Novel Directory Service (NDS) directory, an Active Directory (AD) directory, or another type of directory. The directory 100 is also referred to as a directory service.

The example directory 100 has records 102, 104, 106, 108, 110, 112, and 114. The records can also be referred to as objects. Each record holds particular information regarding a user or a resource, which are called attributes. For example, as shown in FIG. 1, the records 102, 104, 106, 108, 110, 112, and 114 have name, email address, and telephone number attributes. Other attributes can also be used.

The records 102, 104, 106, 108, 110, 112, and 114, are organized hierarchically within the directory 100. Records 102, 104, and 106 are all under North America. More particularly, records 102 and 104 are under North America/Sales, while the record 106 is under North America/Marketing. Records 108, 110, 112, and 114 are all under Europe. More particularly, records 108, 110, and 112 are under Europe/Sales, while the record 114 is under Europe/Marketing. Each record has a distinguished name that combines its location within the hierarchical organization of the directory 100 and the record itself. For example, the record 106 can be refereed to by a distinguished name of North America/Marketing/record 106. Similarly, the record 110 can be referred to by a distinguished name of Europe/Sales/record 110.

Figure 2:
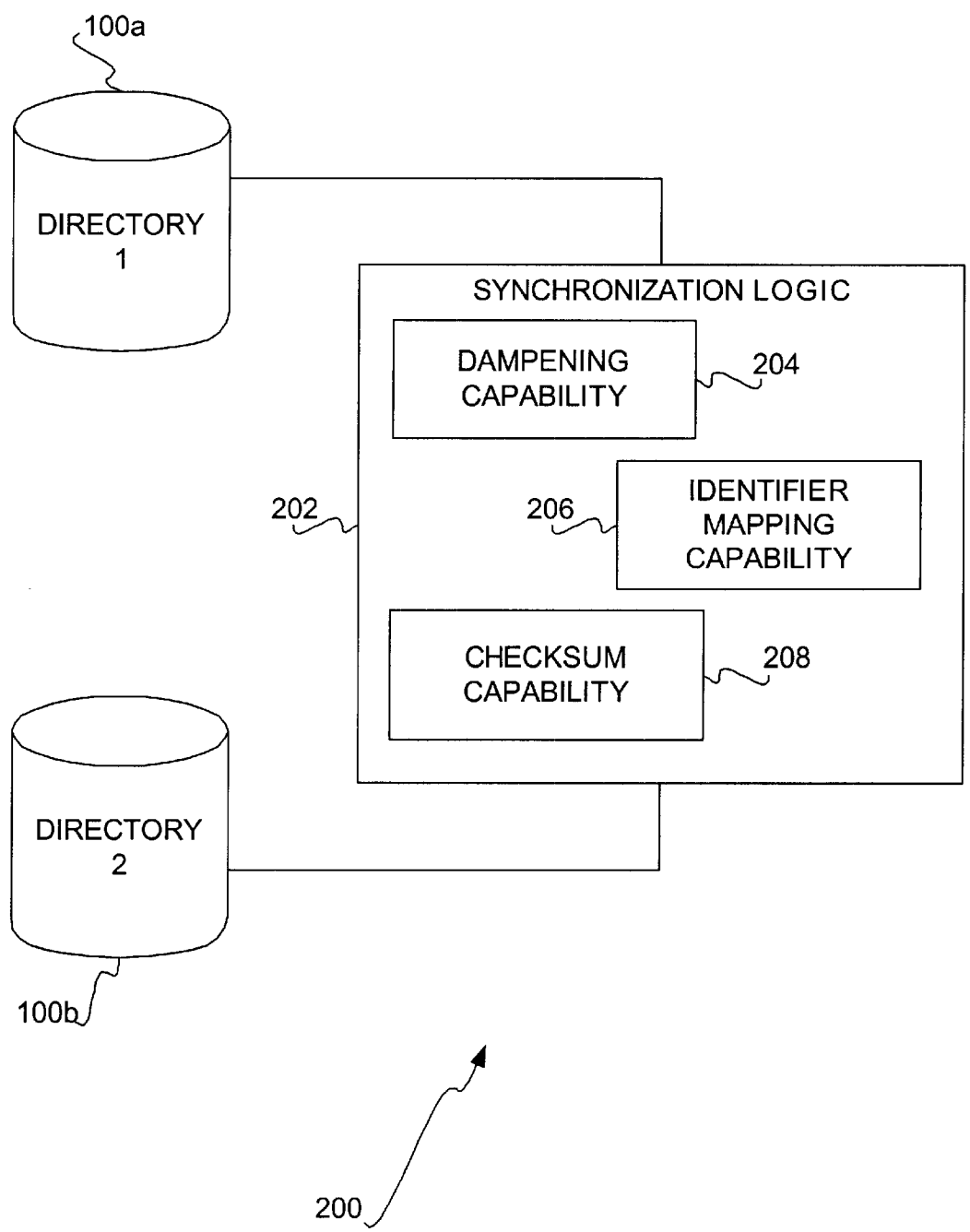
FIG. 2 is a diagram of a system according to an embodiment of the invention.

FIG. 2 is a diagram of a system 200 according to an embodiment of the invention. The system 200 includes a first directory 100a a second directory 100b, and synchronization logic 202. The first directory 100a and the second directory 100b can be particular instances of the example directory 100 of FIG. 1. The first directory 100a is preferably a directory, such as an AD directory, that has an update sequence number (USN) capability. The USN capability means that each change to a record in the directory is associated with a unique, consecutively incremented USN. For example, if an administrator adds a new record, a USN is associated with the addition. As another example, if the administrator changes the email address attribute in a particular record from "john@company.com" to "jon@company.com", a USN is also associated with this change. The USN capability is a mechanism that allows efficient detection and location of the changes made in the first directory 100a. Preferably, the second directory 100b is a directory, such as an NDS directory, that does not have any such mechanism.

The synchronization logic 202 synchronizes the information in the first directory 100a with the information in the second directory 100b. When the first directory 100a and the second directory 100b are synchronized with each other, this means that the information contained in each directory is consistent with each other. The following nomenclature is specifically used. Synchronizing the first directory 100a to the second directory 100b means that the second directory 100b is changed to be consistent with the first directory 100a. Similarly, synchronizing the second directory 100b to the first directory 100a means that the first directory 100a is changed to be consistent with the second directory 100b. The logic 202 performs these synchronizations. The logic 202 can be a computer program.

The synchronization logic 202 has a dampening capability 204, an identifier mapping capability 206, and a checksum capability 208 to assist in efficient synchronization between the directories 100a and 100b. The dampening capability 204 prevents changes that originate from the second directory 100b that already have been synchronized to the first directory 100a from being synchronized back to the second directory 100b. Furthermore, the dampening capability 204 prevents changes from propagating in an endless loop. A change originating from the second directory 100b that is synchronized to the first directory 100a would, without the dampening capability 204, be synchronized back to the second directory 100b, and then again to the first directory 100a. This would continue in an endless loop, were it not for the dampening capability 204. The identifier mapping capability 206 uses an identifier mapping table to map a unique identifier of each record of the first directory 100a to a unique identifier of a corresponding record of the second directory 100b, and vice-versa. The checksum capability 208 uses a checksum for each record of the second directory 100b to allow efficient detection of changes in the second directory 100b. Each of these capabilities 204, 206, and 208 is described in more detail in a later section of the detailed description.

The synchronization logic 202 can also allow changes in one of the directories 100a and 100b to trump changes made in the other of the directories 100a and 100b. Preferably, changes in the first directory 100a trump the changes in the second directory 100b. This means that the logic 202 prevents changes in the second directory 100b from being synchronized to the first directory 100a where changes in corresponding records in the first directory have already been made. For example, if a change has been made to a record in the first directory 100a to change a user name from "Ros" to "Ross", and a change has been made to the corresponding record in the second directory 100b to change the user name from "Ros" to "Frank," the change in the first directory 100a is binding. The user name will be changed to "Ross" in the second directory 100b to match the change in the first directory 100a.

The synchronization logic 202 can also have a retry capability, which is not shown in FIG. 2. If any changes being processed from the first directory 100a to the second directory 100b, or from the second directory 100b to the first directory 100a, are not performed successfully, they are placed in a retry list. Once synchronization has otherwise occurred, the retry list is processed to again attempt to process these changes. The retry list may have to be processed a number of times before all the changes in the list are successfully made.

An example of when the retry capability will be used is when records are received out of order. If a child record comes in for synchronization before a parent record, the child record cannot be added because the parent record first needs to be added. The retry capability allows the parent record to be added first, and the child record saved for retry later.

Tracking Update Sequence Numbers, Including Dampening Capability

Figure 3:
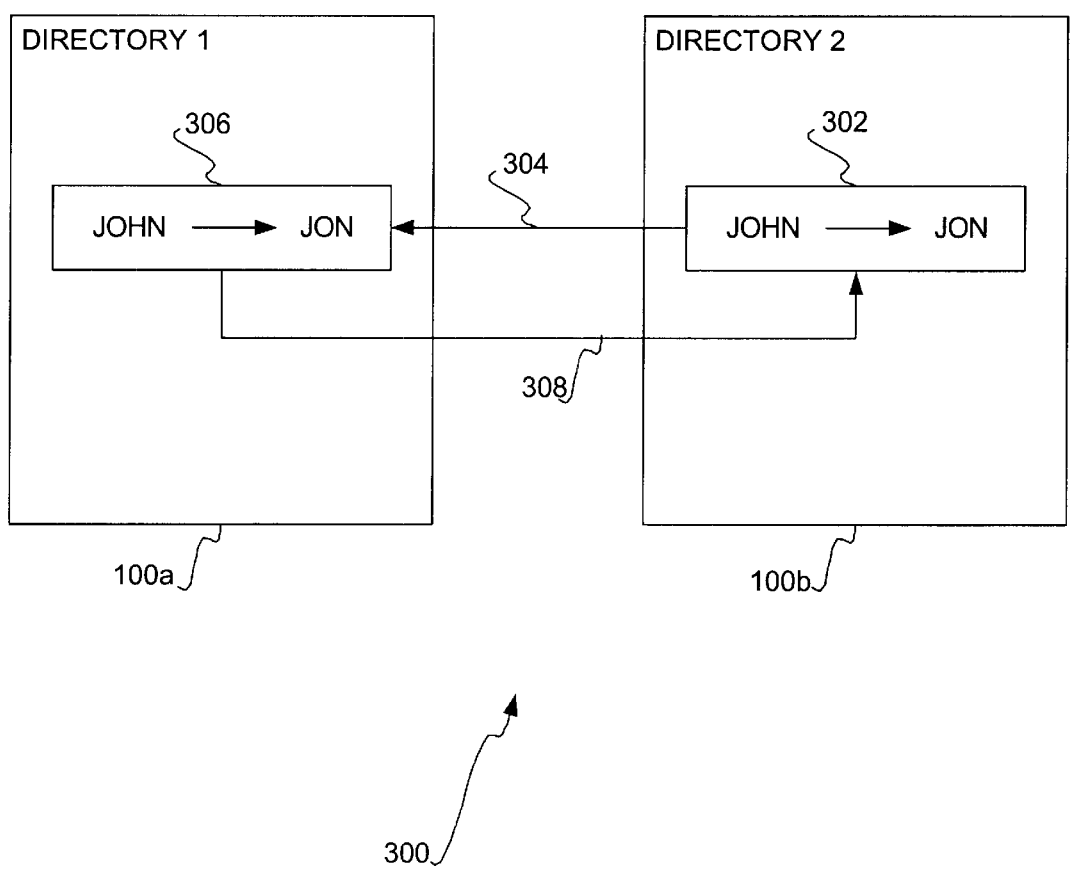
FIG. 3 is a diagram showing the problem that the dampening capability of the synchronization logic prevents.

The dampening capability 204 of the synchronization logic 202 of FIG. 2 is described in more detail by reference to FIGS. 3 and 4. FIG. 3 is a diagram 300 showing the problem that the dampening capability 204 prevents. A change 302 has been made in the second directory 100b to change the first name in a record from "John" to "Jon". When the second directory 100b is synchronized to the first directory 100a, as indicated by the arrow 304, a change 306 is made to the corresponding record in the first directory 100a. The change 306 is detected as a new change, such when the first directory 100a is synchronized to the second directory 100b, as indicated by the arrow 308, it is sent to the second directory 100b. However, because the change initially originated in the second directory 100b, it does not need to be sent back from the first directory 100a to the second directory 100b.

Figure 4:
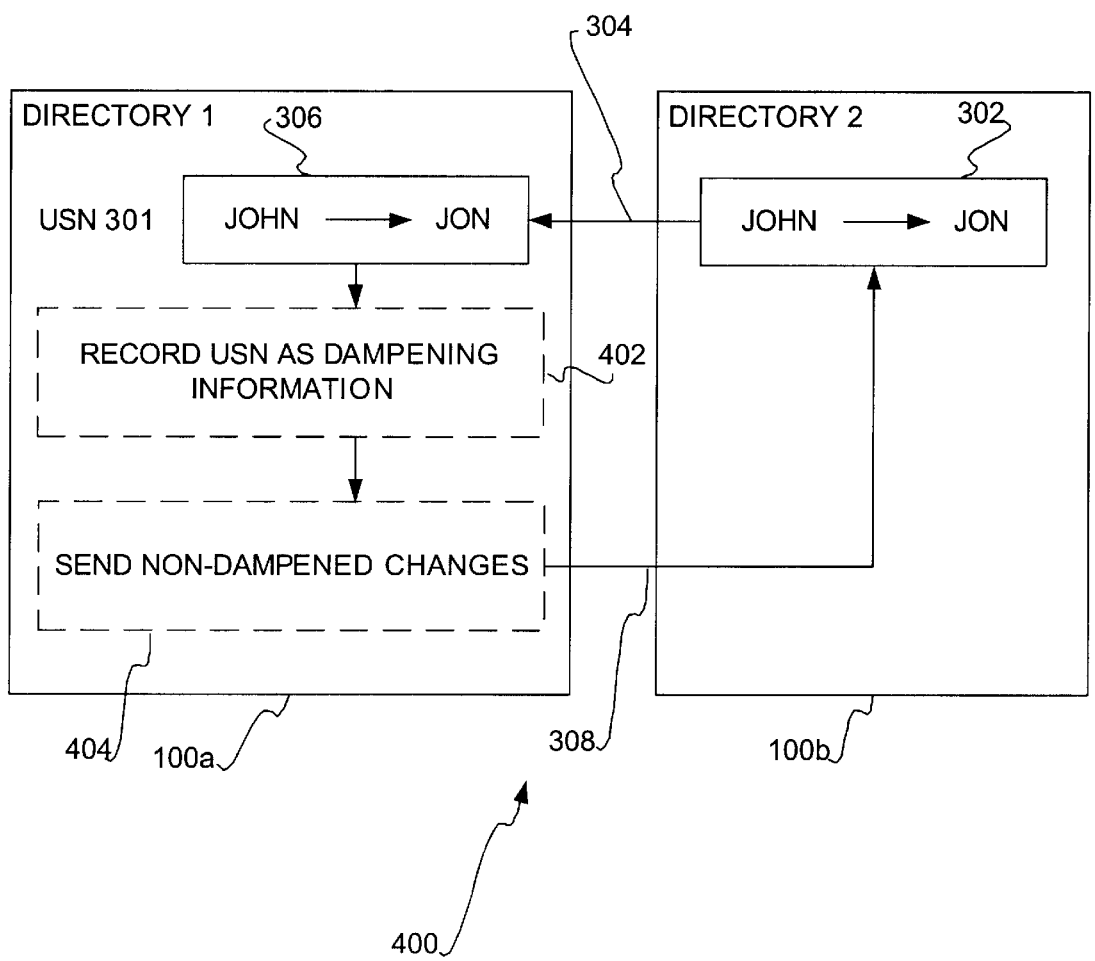
FIG. 4 is a diagram showing how the dampening capability prevents the problem of FIG. 3.

The dampening capability 204 prevents this problem from occurring, as shown in the diagram 400 of FIG. 4. The change 302 is sent from the second directory 100b to the first directory 100a when the former directory is synchronized to the latter directory. This causes the change 306 in the corresponding record in the first directory 100a. As indicated by the dotted line box 402, the dampening capability 204 records an update sequence number (USN) associated with the change 306 as dampening information. When the first directory 100a is synchronized to the second directory 100b, as indicated by the arrow 308, only non-dampened changes are sent to the second directory 100b, as indicated by the dotted line box 404. For the record that is the subject of the change 306, only changes that have USN's greater than the USN recorded as the dampening information in the dotted line box 402 are sent to the second directory 100b. The change 306 in particular is not sent to the second directory 100b during synchronization. The dampening capability 204 thus uses the USN capability of the first directory 100a.

The dampening capability 204 described in the previous paragraph is the general case. However, the dampening capability 204 may incorrectly dampen legitimate changes made to a record in the first directory 100a while it is being synchronized with changes from the second directory 100b. When synchronizing changes from the second directory 100b to the first directory 100a, interstitial changes may occur while synchronization takes place. For example, there may be a change to a given record being synchronized from the second directory 100b to the first directory 100a. After the change is made, and before the dampening information is recorded, it is supposed that the user changes the same record again in the first directory 100a. Now the dampening information and the USN recorded will result from the changes that the user made directory to the first directory 100a. This change would then be incorrectly dampened, such that the user's change to the first directory 100a would not be sent to the second directory 100b during the next synchronization from the first directory 100a to the second directory 100b.

The dampening capability 204 in the specific case prevents the problem described in the previous paragraph from occurring. More specifically, when synchronizing changes from the second directory 100b to the first directory 100a, the first version number of an attribute is read, which as an example is x. The change from the second directory 100b to the first directory 100a is then made, and the version number is again read, to ensure that it is x+1. If it is x+2 or greater, this means that the attribute has been modified by something other than the synchronization from the second directory 100b to the first directory 100a. As a result, it cannot be determined when the change from the second directory 100b to the first directory 100a occurred relative to the other changes). Therefore, no dampening information is recorded, such that the changes from the first directory 100a are not dampened during synchronization from the first directory 100a to the second directory 100b.

As described in the previous paragraph, version numbers are used instead of USN's in one particular embodiment. Version numbers are specific to each attribute. When an attribute of a record changes, the version number associated with that attribute increases. USN's cannot be used in lieu of version numbers as described in the previous paragraph, because USN's are associated with any change to records in the first directory 100a. However, the dampening capability 204 is only interested in whether a particular attribute of a particular record has changed. This is why version numbers are used instead of USN's in this case.

The dampening capability 204 utilizes tracking of USN's. However, tracking of USN's is accomplished for other purposes, besides to provide for the dampening capability 204. This is described in more detail in subsequent sections of the detailed description. However, in general, tracking of USN's is also utilized to ensure that changes to the first directory 100a have a higher priority than changes to the second directory 100b. As will be described, when a change in a record in the second directory 100b is being synchronized back to the corresponding record in first directory 100a, it is in fact only synchronized if there is not a newer change to the corresponding record in the first directory 100a. This is accomplished by comparing the appropriate USN's, such that if newer changes are detected in the first directory 100a, the change to the record in the second directory 100b is not made to the corresponding record in the first directory 100a.

Identifier Mapping Capability

Figure 5:
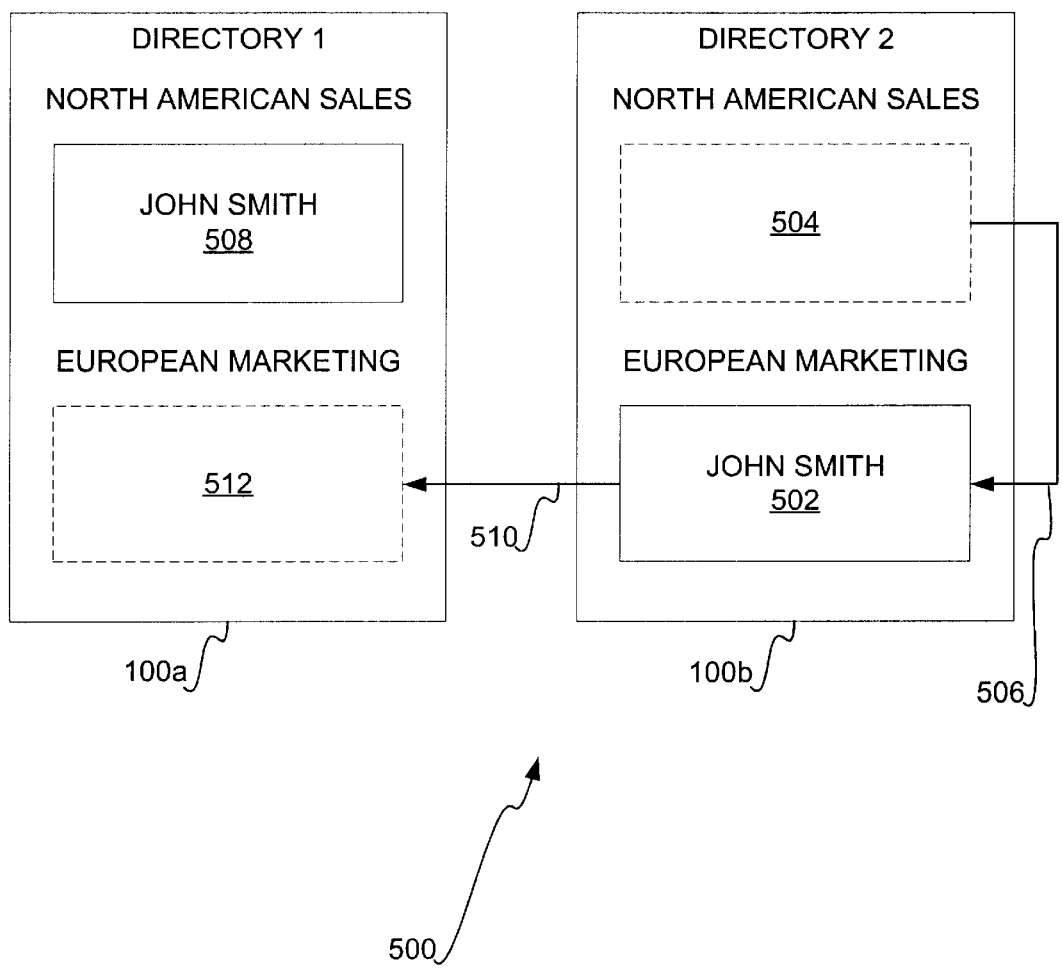
FIG. 5 is a diagram showing the problem that the identifier mapping capability of the synchronization logic prevents.

The identifier mapping capability 206 of the synchronization logic 202 of FIG. 2 is described in more detail by reference to FIGS. 5 and 6. FIG. 5 is a diagram 500 showing an example of the problems that the identifier mapping capability 206 prevent. The record 502 in the second directory 100b that has the name "John Smith" has been moved to European Marketing from a previous location 504 in North American Sales, as indicated by the arrow 506. The record 502 has the corresponding record 508 in the first directory 100a. When the second directory 100b is synchronized to the first directory 100a, as indicated by the arrow 510, the record 508 is not found at the location 512 in the first directory 100a by its distinguished name. That is, the record 502 has a distinguished name of "European Marketing/John Smith," while the corresponding record 508 still has the distinguished name of "North American Sales/John Smith." The synchronization logic may not know that the record 508 corresponds to the record 502. As a result, it may incorrectly add a new record at the location 512 in the first directory 100a. This would be incorrect, because then there would be two "John Smith" records in the first directory 100a.

Figure 6:
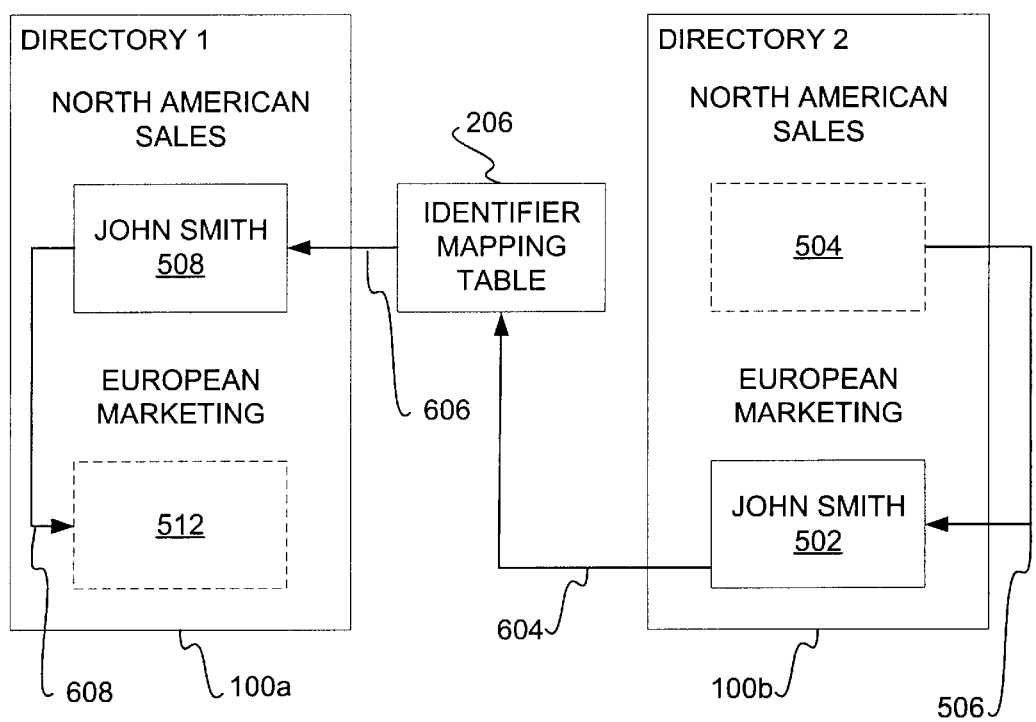
FIG. 6 is a diagram showing how the identifier mapping capability prevents the problem of FIG. 5.

The identifier mapping capability 206 addresses this problem, as shown in the diagram 600 of FIG. 6. An identifier mapping table 602 is used to map an identifier for each record in the first directory 100a with an identifier for its corresponding record in the second directory 100b, and vice-versa. For example, an identifier the record 508 of the first directory 100a is mapped to an identifier the record 502 of the second directory 100b. The identifier can be a guaranteed unique identifier (GUID). Preferably, the first directory 100a is a directory, such as an Active Directory (AD) directory, that automatically assigns an identifier to each record. The identifier is externally accessible, and not internal to the directory itself. As used herein, the term identifier implies an externally accessible identifier. However, the second directory 100b may be a directory, such as a Novell Directory Services (NDS) directory, that does not assign an externally accessible identifier to each record. In this instance, the identifier mapping capability 206 generates an identifier for each record, and stores it as a new attribute for the record in the second directory 100b. The identifier mapping capability 206 can be used to track moved records within the first directory 100a and the second directory 100b. This allows moved records to be efficiently located by their identifiers.

The problem of FIG. 5 is addressed in FIG. 6 as follows during synchronization from the second directory 100b to the first directory 100a. When a record in the first directory 100a corresponding to the record 502 in the second directory 100b cannot be located by distinguished name, the identifier mapping table 602 is used, as indicated by the arrow 604. The table 602 is used to determine if there is a record in the first directory 100a that corresponds to the record 502 in the second directory 100b. As indicated by the arrow 606, the record 508 will be found as corresponding to the record 502. This record 508 in the first directory 100a is then moved to the location 512, as indicated by the straw 608. It is noted therefore, that the identifier mapping capability 206 aids in both the locating of moved records, and moving records so that that are synchronized.

Checksum Capability

Figure 7:
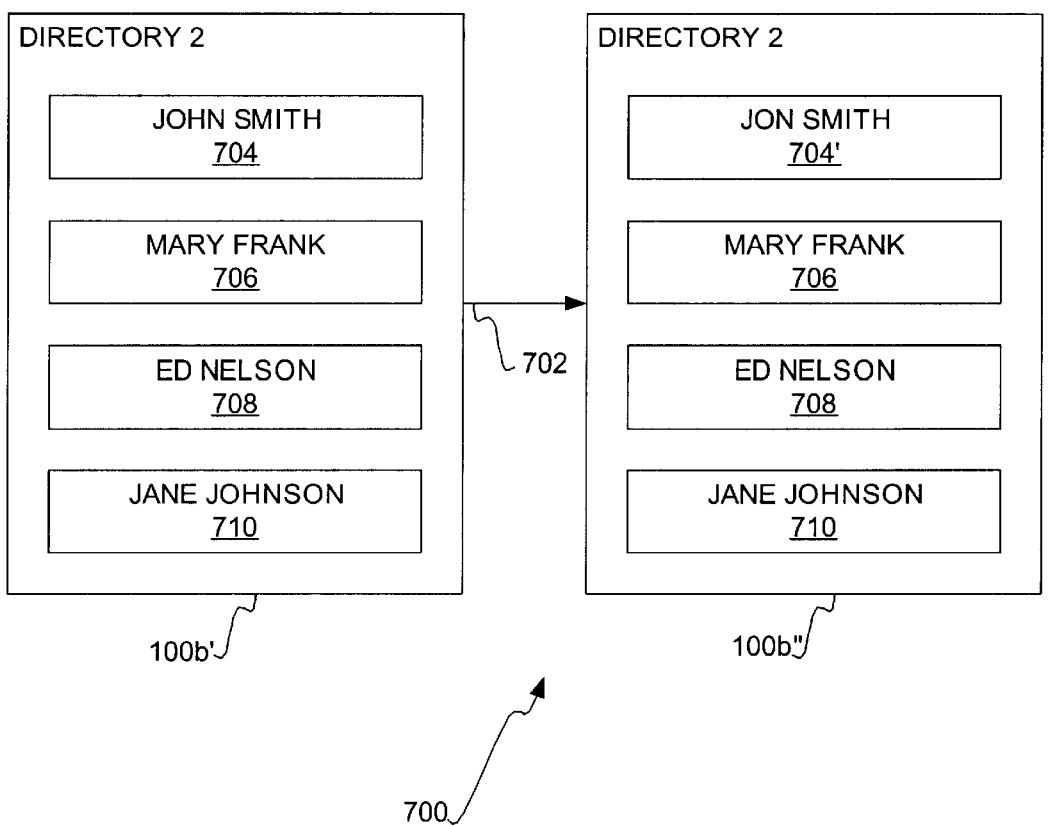
FIG. 7 is a diagram showing the problem that the checksum capability of the synchronization logic addresses.

The checksum capability 208 of the synchronization logic 202 of FIG. 2 is described in more detail by reference to FIGS. 7 and 8. FIG. 7 is a diagram 700 showing the problem that the checksum capability 208 addresses. The diagram 700 shows the second directory 100b at a before time, indicated as the second directory 100b', and at an after time, indicated as the second directory 100b". Before changes are made to the second directory 100b, as indicated by the arrow 702, the directory 100b' has four records 704, 706, 708, and 710. After the changes are made, the directory 100b" has four records 704', 706, 708, and 710. In particular one change is made to the record 704 of the directory 100b', such that this record is indicated as the record 704' in the directory 100b". The name of the record 704 has changed from "John Smith" in the second directory 100b' at the before time, to "Jon Smith" in the record 704' of the second directory 104b" at the after time.

The problem that is shown by the diagram 700 of FIG. 7 is that there is no efficient mechanism for detecting which records in the second directory 100b have changed from the before time to the after time, as indicated by the arrow 702. In particular, there is no efficient mechanism to detect that the record 704 has had its name attribute changed to become the record 704'. This assumes that the second directory 100b does not have an update sequence number (USN) capability. The checksum capability 208 addresses this problem, by determining and storing a checksum for each record. When a new checksum for a record is determined that differs from the previously determined and stored checksum for the record, this indicates that the record has changed. A checksum is a calculated value that is used to test data for the presence of differences between two records. The checksum can be determined by using the values from all the attributes of a record. For a given set of values, the checksum is always the same. The checksum changes only if any of the attributes change.

Figure 8:
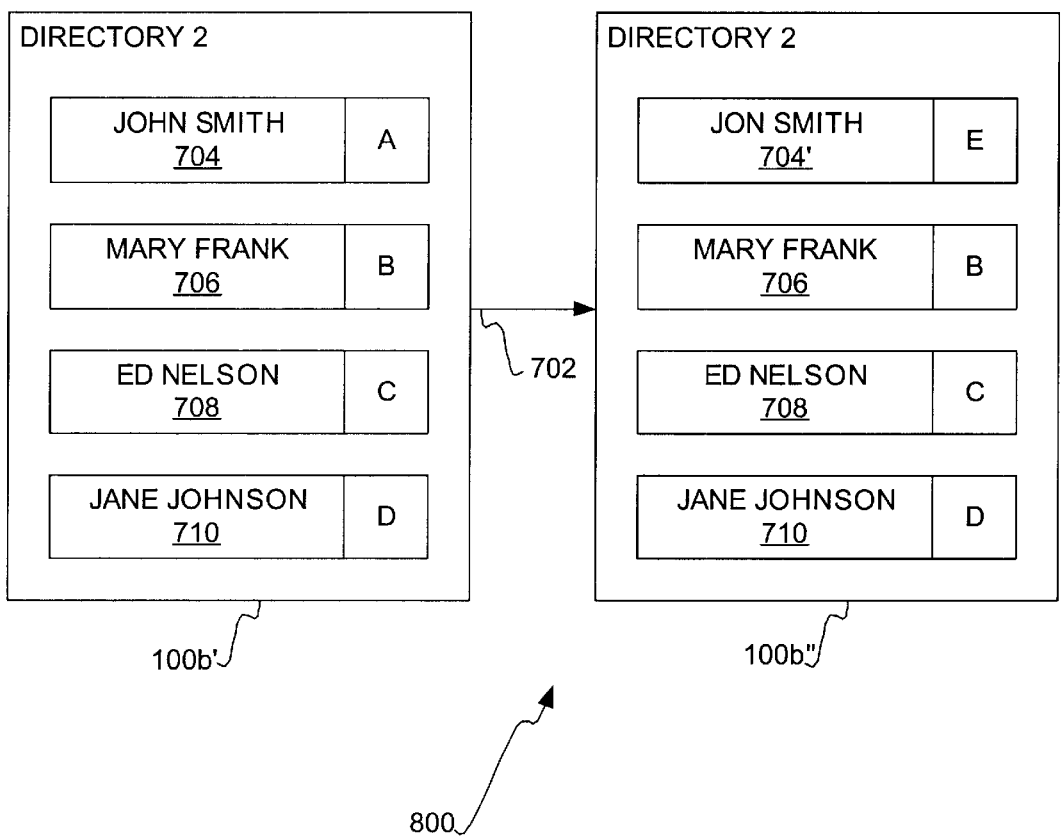
FIG. 8 is a diagram showing how the checksum capability addresses the problem of FIG. 7.

The checksum capability 208 addresses the problem of FIG. 7, as shown in the diagram 800 of FIG. 8. At the before time, each record in the directory 100b' has a checksum determined and stored. The records 704, 706, 708, and 710 of the directory 100b' have the checksum values A, B, C, and D, respectively, where A, B, C, and D are shorthand potations for numeric values. For example, a checksum value may be a number between 0 and 65535, for a total of $2^8$ different numbers. Once the changes have been made to the directory 100b', as indicated by the arrow 702, to yield the directory 100b", the checksums are redetermined. These new checksums are compared against the stored checksums to efficiently detect which records have changed. The records 704', 706, 708, and 710 of the directory 100b" have the new checksum values E, B, C, and D, respectively. Because the checksum value E for the record 704' differs from the checksum A for the record 704, this indicates that the record 704 has changed. The other records 706, 708, and 710 have the same checksum values at the before and the after times, indicating that they have not changed. When the second directory 100b is synchronized to the first directory 100a, the change to the record 704 is sent, and the new checksum value stored for the record 704.

Synchronizing from a Second Directory to a First Directory

Figure 9:
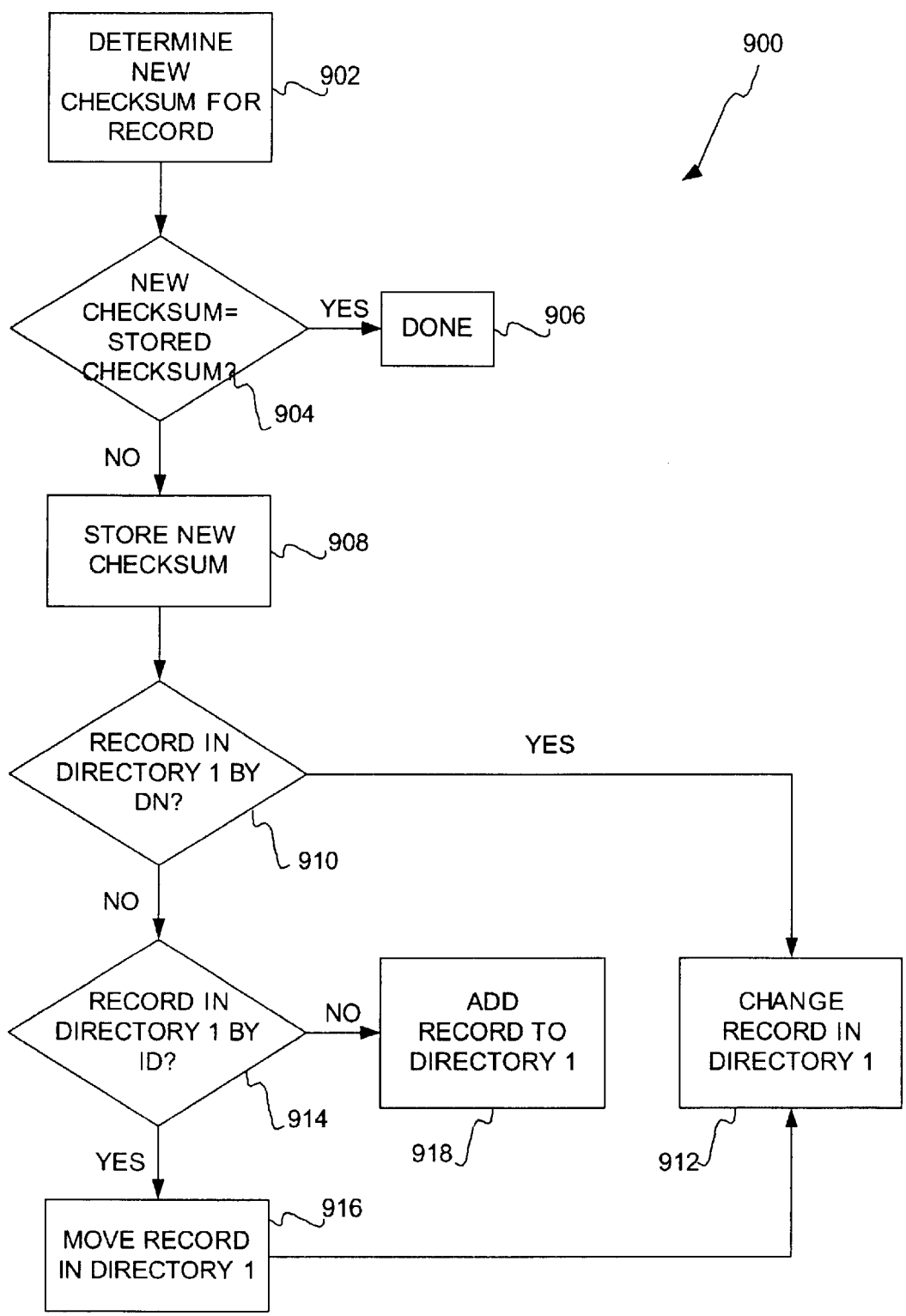
FIG. 9 is a flowchart of a method showing how one embodiment synchronizes a second directory to a first directory.

FIG. 9 is a flowchart of a method 900 showing how one embodiment synchronizes the second directory 100b of FIG. 2 to the first directory 100a of FIG. 2. The method 900 can be performed by the synchronization logic 202 of FIG. 2. The method 900 is performed for each record of the second directory 100b. In 902, the method 900 determines a new checksum for a record. If the new checksum matches the previously determined and stored checksum for the record, then the method 900 proceeds from 904 to 906, where it is finished. This corresponds to the situation where the record has not changed. Otherwise, the method 900 proceeds from 904 to 908. In 908, the new checksum for the record is stored, such as by an additional attribute for the record, or as a record in a separate table or database. In 910, a corresponding record is located in the first directory 100a by its distinguished name. If the corresponding record can be located in the first directory 100a by its distinguished name, then in 912 the record in the first directory 100a may be changed to be consistent with the record in the second directory 100b.

Alternatively, if there are new changes to the record in the first directory 100a, the changes to the record in the second directory 100b are not made to the record in the first directory 100a. (How new changes to the record in the first directory 100a are detected is specifically described later in the application.) This is because changes to the first directory 100a are of higher priority than changes to the second directory 100b. The method 900 is then finished. In such a case, the changes from the first directory 100a are pushed to the second directory 100b during the synchronization from the first directory 100a to the second directory 100b. That is, although changes from the first directory 100a are of higher priority, the two directories will eventually become synchronized because these changes will be pushed to the second directory 100b during the next synchronization from the first directory 100a to the second directory 100b.

It is noted that the first directory 100a being of higher priority than the second directory 100b is an arbitrary decision. Alternatively, the second directory 100b can be of higher priority than the first directory 100a. However, it is necessary to have one of the directories being of higher priority than the other, so that there is a standard manner by which conflicting changes to records in the directories are resolved. For example, if after synchronization a change has been made to a record in the first directory 100a to change the name "John Smith" to "Jon Smith;" and a change has been made to the corresponding record in the second directory 100b to change the name to "Jonathon Smith," one of the changes must have higher priority. As has been described, the change to the record in the first directory 100a, to "Jon Smith," overrules the change to the corresponding record in the second directory 100b, to "Jonathon Smith." However, alternatively, the change to the corresponding record in the second directory 100b, to "Jonathon Smith," can overrule the change to the record in the first directory 100a, to "Jon Smith," if so desired.

However, if the corresponding record cannot be located in the first directory 100a by its distinguished name, then in 914 the corresponding record is located in the first directory 100a by its identifier. This is the identifier for the corresponding record in the first directory 100a that is mapped to the identifier for the record in the second directory 100b by the identifier mapping table. If the corresponding record cannot be located in the first directory 100a by its identifier, then in 918 a new record is added to the first directory 100a to correspond to the record in the second directory 100b.

If the corresponding record can be located in the first directory 100a by its identifier, then the method proceeds to 916 only if the record has been moved in the second directory 100b. Conversely, and not explicitly shown in FIG. 9, the method does not proceed to 916 if the record has been moved in the first directory 100a, and instead the method proceeds directly to 912. (How the movement of the record in the first directory 100a is detected is described later in the application.) That is, 916 is not performed if the record has been moved in the first directory 100a. If 916 is in fact proceeded to, then in 916 the record is moved within the first directory 100a so that it has the same distinguished name as the record in the second directory 100b. If the record was moved in the first directory 100a, such that 916 is not performed, then, during the next synchronization from the first directory 100a to the second directory 100b, the record in the second directory 100b will be moved.

From 916 only (and not from 918), the method 900 proceeds to 912, where the recently moved or newly created record in the first directory 100a may be changed to be consistent with the record in the second directory 100b. However, as has been indicated, if there has been a change to the record in the first directory 100a, the change to the record in the second directory 100b will not be made to the record in the first directory 100a. Rather, during the next synchronization from the first directory 100a to the second directory 100b, the change to the record in the first directory 100a will be made to the record in the second directory 100b. This is because changes made in the first directory 100a are of higher priority than changes made in the second directory 100b.

Figure 10:
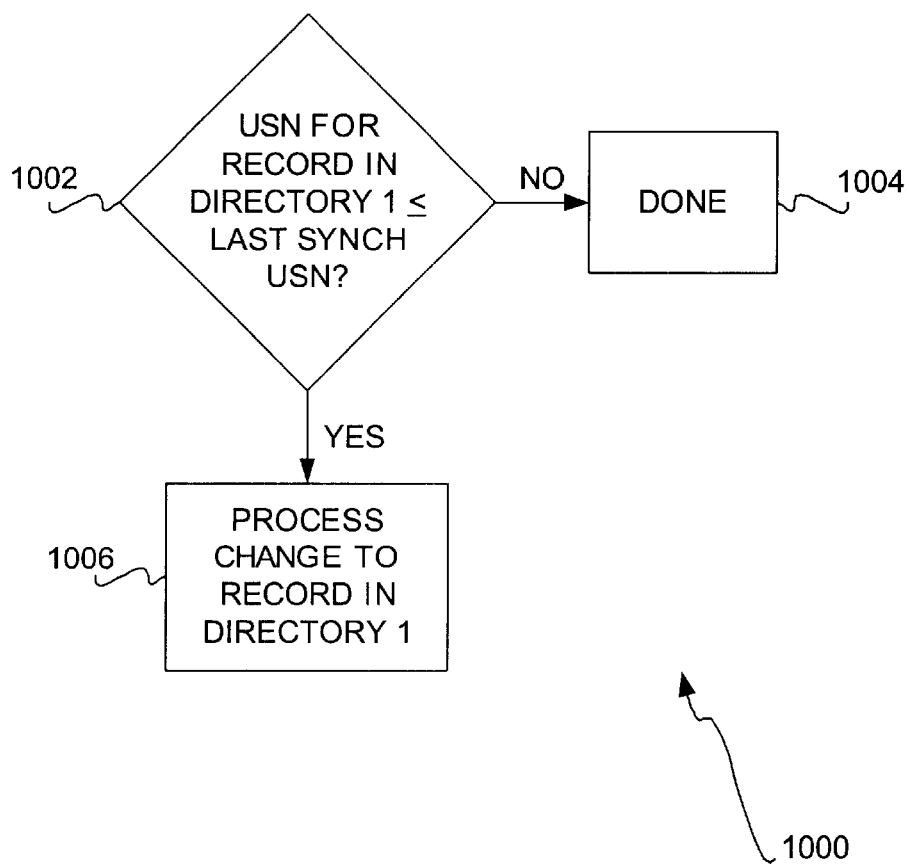
FIG. 10 is a flowchart of a method showing how one embodiment processes changes in the first directory in the method of FIG. 9.

FIG. 10 is a method 1000 showing how one embodiment of the invention changes a record in the first directory 100a to be consistent with a record in the second directory 100b. The method 1000 can be performed within 912 and 916 of the method 900 of FIG. 9, before the actions that are the subject of 912 and 916 are performed. The method 1000 is performed so that changes in the first directory 100a are of higher priority and trump changes in the second directory 100b.

In 1002, the update sequence number (USN) of the last change for the corresponding record in the first directory 100a is compared against the USN recorded that corresponds to the USN of the last time this record was synchronized from the first directory 100a. More specifically, the USN for each attribute of a changed record is compared. If the former USN is less than or equal to the latter USN, this means that the record in the first directory 100a has not changed since the last time this record was synchronized from the first directory 100a. If the USN of an attribute in the first directory 100a is higher than the USN associated with the last time the first directory 100a was synchronized to the second directory 100b, this means that the attribute has been changed since the last time synchronization occurred from the first directory 100a to the second directory 100b. This implies that there have been new changes that have not been synchronized to the second directory 100b. Because the first directory 100a has priority, the changes to the attribute in the first directory 100a from the second directory 100b are not made, and are discarded. An attribute for a record can be define generally as field information for the record. For example, the last name of the record may be one attribute, and the first name of the record may be another attribute. Other attributes can include phone numbers, addresses, email addresses, and the like. The method 1000 proceeds to 1006, where the change to the record in the first directory 100a is affirmatively processed to be consistent with the corresponding record in the second directory 100*b*. For example, the action that is the subject of 912 and 916 of FIG. 9 is performed.

Otherwise, the method proceeds to 1004, corresponding to the situation where the record in the first directory 100*a* has changed since the last time this record was synchronized from the second directory 100*b*. Because changes in the first directory 100*a* trump changes in the second directory 100*b*, the method 1000 finishes in 1004 without processing the changes to the record in the first directory 100*a*. This is so that the change to the corresponding record in the second directory 100*b* does not trump the change to the record in the first directory 100*a*. For example, the action that is the subject of 912 and 916 of FIG. 9 is not performed.

It is noted that when the second directory 100*b* is synchronized to the first directory 100*a* by performing the method 900 of FIG. 9 and the method 1000 of FIG. 10, one or more of the changes to the first directory 100*a* may not be successfully processed. In such an instance, these changes can be added to a retry list. The changes in the retry list can then be attempted again after completion of the method 900 of FIG. 9 for all the records of the second directory 100*b*. When a change in the retry list is successfully processed, it is removed from the list. The retry list is processed a predetermined number of times, such as twice.

Synchronizing from a First Directory to a Second Directory

Figure 11:
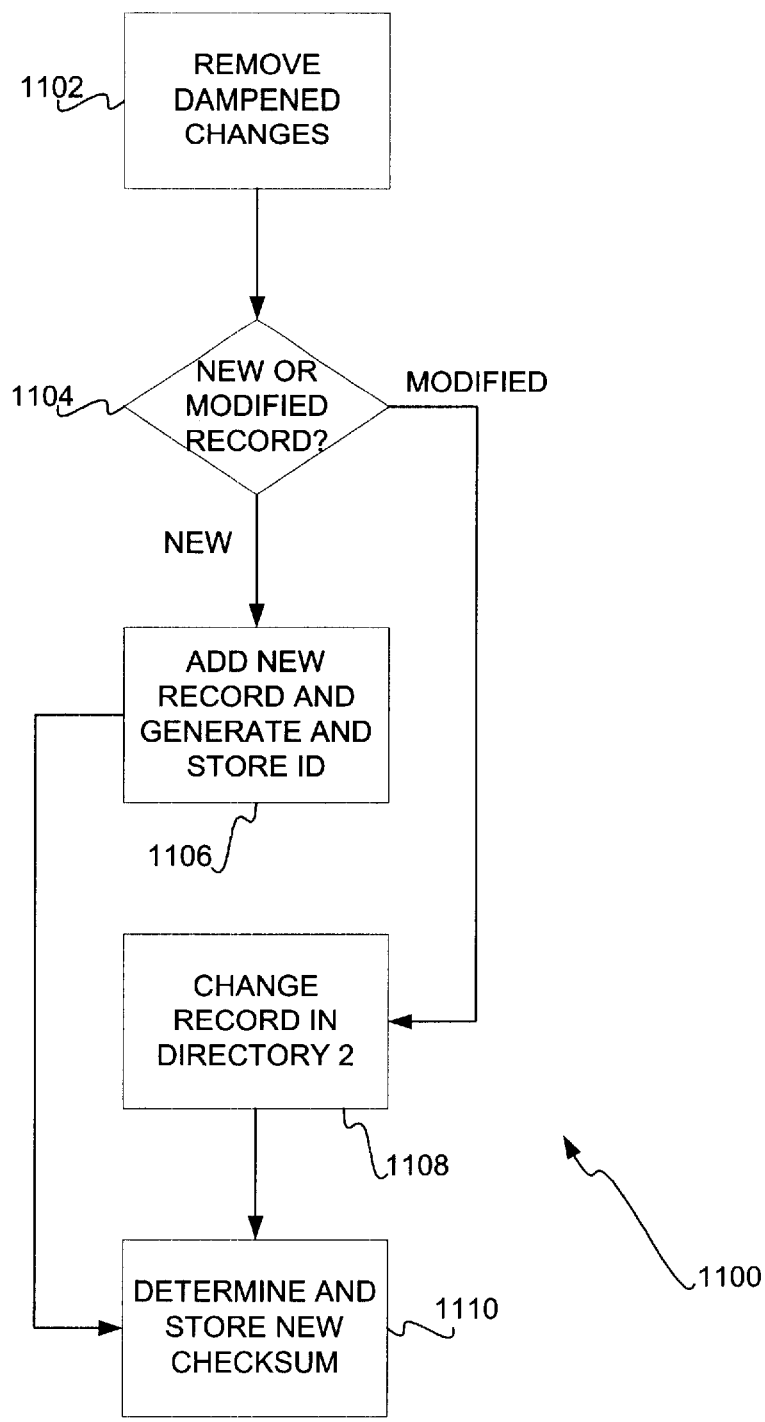
FIG. 11 is a flowchart of a method showing how one embodiment synchronizes a first directory to a second directory.

FIG. 11 is a flowchart of a method 1100 showing how one embodiment synchronizes the first directory 100*a* of FIG. 2 to the second directory 100*b* of FIG. 2. The method 1100 can be performed by the synchronization logic 202 of FIG. 2. The method 1100 is performed for each record of the first directory 100*a*. In 1102, dampened changes are removed from the changes for a record in the first directory 100*b* that are to be made to the second directory 100*b*. The dampened changes are changes that originated as changes in the second directory 100*b*, as has been described. The non-dampened changes are then processed to the corresponding record of the second directory 100*b*.

In 1104, it is determined if a corresponding record will be added to the second directory 100*b*, or an existing record will be modified to the second directory 100*b*. If a new record is to be added, then the method 1100 proceeds to 1106, where a corresponding new record is added to the second directory 100*b*. An identifier for the new record in the second directory 100*b* is also generated and stored in 1106. The identifier for the record of the first directory 100*a* is mapped to the identifier for the new record of the second directory 100*b*. In the identifier mapping table.

However, if the record of the second directory 100*b* is to be modified, then the method proceeds not to 1106, but to 1108. In 1108, the corresponding record in the second directory 100*b* is changed to be consistent with the record in the first directory 100*a*. This may include moving the record in the second directory 100*b* so that the distinguished name of this record is the same as that of the record in the first directory 100*a*, if the record in the first directory 100*a* has been moved. If the change being processed in 1108 is unsuccessful, it can be added to the retry list. The changes in the retry list can then be attempted again after completion of the method 1100 of FIG. 1100 for all the records of the first directory 100*a*. When a change in the retry list is successfully processed, it is removed from the list. The retry list is processed a predetermined number of times, such as twice. From either 1106 or 1108, the method proceeds to 1110, where a new checksum for the record in the second directory 100*b* is determined and stored.

Retry List

As has been referred to in some of the preceding sections of the detailed description, a retry list can be used in one embodiment. Changes that cannot processed during synchronization from the second directory 100*b* to the first directory 100*a*, or vice-versa, are placed in the retry list. Once a synchronization pass has been accomplished, or at another time, the changes that are in the retry list are again attempted to be processed. When a change is successfully processed, it is removed from the retry list. Two or more passes may be necessary to completely flush the retry list of changes after a synchronization pass from one directory to another has occurred.

An example of the retry list is as follows. A change to the second directory 100*b* results in the creation of a new sub-directory "engineering" under the already existing sub-directory "Europe." A new record "Bob Smith" is then created in the engineering sub-directory. When the changes from the second directory 100*b* to the first directory 100*a* are synchronized these changes may be processed out of order. That is, the record "Bob Smith" may be received before the new sub-directory "engineering" is received. It is noted that the sub-directory "Europe" has been created previously. However, attempting to create the appropriate new record "Bob Smith" in the first directory 100*a*, before an engineering sub-directory is created in the first directory 100*a*, will result in an error. Therefore, the creation of the new record "Bob Smith" is placed in the retry list. Once the synchronization from the second directory 100*b* to the first directory 100*a* is complete, an engineering sub-directory will have been created in the first directory 100*a*. When the retry list is processed, the appropriate new record can then be created in the engineering sub-directory of the first directory 100*a*.

Example Computerized Device

Figure 12:
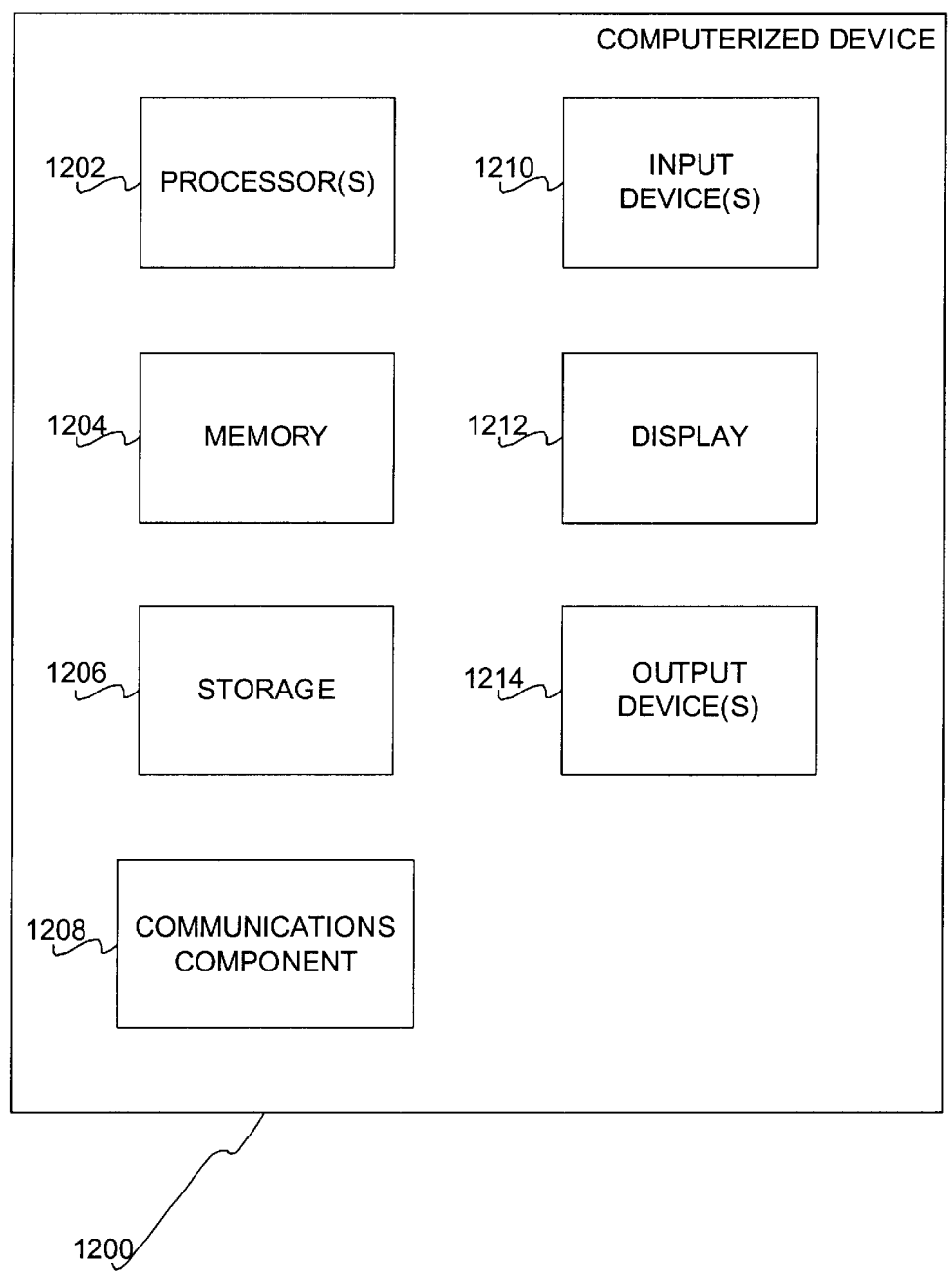
FIG. 12 is a diagram of an example computerized device that can be used to implement the invention.

The invention can be implemented within a computerized environment having one or more computerized devices. The diagram of FIG. 12 shows an example computerized device 1200. The synchronization logic 202 of FIG. 2 can be implemented on such a device 1200. The example computerized device 1200 can be, for example, a desktop computer, a laptop computer, or a personal digital assistant (PDA). The invention may be practiced with other computer system configurations as well, including multiprocessor systems, microprocessor-based or programmable consumer electronics, network computers, minicomputers, and mainframe computers. The invention may be practiced in distributed computing environments where tasks are performed by remote processing devices that are linked though a communications network.

The device 1200 includes one or more of the following components: processor(s) 1202, memory 1204, storage 1206, a communications component 1208, input device(s) 1210, a display 104, and output device(s) 1214. For a particular instantiation of the device 1200, one or more of these components may not be present. For example, a (PDA). may not have any output device(s) 1214. The description of the device 1200 is to be used as an overview of the types of components that typically reside within such a device, and is not meant as a limiting or exhaustive description.

The processor(s) 1202 may include a single central-processing unit (CPU), or a plurality of processing units, commonly referred to as a parallel processing environment. The memory 1204 may include read-only memory (ROM) and/or random-access memory (RAM). The storage 1206 may be any type of storage, such as fixed-media storage devices and removable-media storage devices. Examples of the former include hard disk drives, and flash or other non-volatile memory. Examples of the latter include tape drives, optical doves like CD-ROM drives, and floppy disk drives. The storage devices and their associated computer-readable media provide non-volatile storage of computer-readable instructions, data structures, program modules, and other data. Any type of computer-readable media that can store data and that is accessible by a computer can be used.

The device 1200 may operate in a network environment. Examples of networks include the Internet, intranets, extranets, local-area networks (LAN's), and wide-area networks (WAN's). The device 1200 may include a communications component 1208, which can be present in or attached to the device 1200. The component 1208 may be one or more of a network card, an Ethernet card, an analog modem, a cable modem, a digital subscriber loop (DSL) modem, and an Integrated Services Digital Network (ISDN) adapter. The input device(s) 1210 are the mechanisms by which a user provides input to the device 1200. Such device(s) 1210 can include keyboards, pointing devices, microphones, joysticks, game pads, and scanners. The display 104 is how the device 1200 typically shows output to the user. The display 104 can include cathode-ray tube (CRT) display devices and flat-panel display (FPD) display devices. The device 1200 may provide output to the user via other output device(s) 1214. The output device(s) 1214 can include speakers, printers, and other types of devices.

The methods that have been described can be computer-implemented on the device 1200. A computer-implemented method is desirably realized at least in part as one or more programs running on a computer. The programs can be executed from a computer-readable medium such as a memory by a processor of a computer. The programs are desirably storable on a machine-readable medium, such as a floppy disk of a CD-ROM, for distribution and installation and execution on another computer. The program or programs can be a part of a computer system, a computer, or a computerizes device.

Conclusion

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A synchronization logic to synchronize a first directory and a second directory, both directories being stored on one or more computer-readable media, the first directory having an update sequence number capability where a change in the first directory is associated with a unique, consecutively incremented update sequence number, the logic being computer-executable instructions stored on a computer-readable medium, when such instructions are executed by a computer, the logic having at least one synchronization capability selected from a group of synchronization capabilities essentially consisting of:

a dampening capability, utilizing the update sequence number capability of the first directory, to prevent changes originating from the second directory already synchronized to the first directory from being synchronized back to the second directory as changes originating from the first directory;

an identifier mapping capability, utilizing a table mapping a unique identifier of each of a plurality of records of the first directory with a unique identifier of a corresponding record of a plurality of records of the second directory, to track moved records within the first and the second directories, the table being maintained separately from the first and second directories; and, a checksum capability, utilizing a checksum for each of the plurality of records in the second directory, to allow efficient detection of changes in specific individual records in the second directory, where the use of checksum is the only mechanism for efficiently detecting the changes in the second directory, where the changes can include deletions.

2. The synchronization logic of claim 1, wherein the logic is stored as a computer program on a machine-readable medium for execution by a processor.

3. The synchronization logic of claim 1, wherein each of the plurality of records in the first directory is an object.

4. The synchronization logic of claim 1, wherein each of the plurality of records in the second directory is an object.

5. The synchronization logic of claim 1, wherein logic prevent changes in the second directory from being synchronized to the first directory where changes in corresponding records in the first directory have already been made.

6. The synchronization logic of claim 5, wherein a record within the first directory is allowed to be changed during synchronization from a corresponding record within the second directory only where an update sequence number for the record within the first directory is less than or equal to a corresponding update sequence number for a last time the first directory has been synchronized to the second directory.

7. The synchronization logic of claim 1, wherein the dampening capability tracks a highest update sequence number as dampening information for each record in the first directory that has been synchronized from the second directory, such that the first directory is synchronized to the second directory only for each record of the first directory having changes with update sequence numbers greater than the dampening information.

8. The synchronization logic of claim 1, wherein the identifier mapping capability allows a record in the first directory to be located by mapping the unique identifier for the corresponding record in the second directory to the unique identifier for the record in the first directory, and vice-versa.

9. The synchronization logic of claim 1, wherein the checksum capability detects whether a record in the second directory has changed by determining a new checksum for the record and comparing the new checksum with a previously determined and stored checksum, such that the new checksum being different than the previously determined and stored checksum indicates that the record has changed.

10. A method for synchronizing a first directory to a second directory, the first directory having an update sequence number capability where a change in the first directory is associated with a unique, consecutively incremented update sequence number, the method comprising:

dampening changes originating from the second directory already synchronized to the first directory utilizing the update sequence number capability, to prevent the changes from being synchronized back to the second directory as changes originating from the first directory; and, processing each of at least one change in the first directory as a current change by making the current change to the record in the second directory and determining and storing a new checksum for the record in the second directory, where the use of checksum is the only mechanism for efficiently detecting the changes in the second directory, where the changes can include deletions.

11. The method of claim 10, wherein the method is performed by execution of a computer program stored on a machine-readable medium by a processor.

12. A method for synchronizing a second directory to a first directory, the first directory having an update sequence number capability where a change in the first directory is associated with a unique, consecutively incremented update sequence number, the method comprising processing each of a plurality of records in the second directory as a current record in the second directory by:

- determining a new checksum for the current record in the second directory, comparing the new checksum with a previously determined and stored checksum for the current record in the second directory, and as a result of checksum comparison, determining that the new checksum is different from the previously determined and stored checksum;
- locating a record in the first directory corresponding to the current record in the second directory and creating the record in the first directory where the record in the first directory cannot be located; and,
- changing the record in the first directory to be consistent with the current record in the second directory.

13. The method of claim 12, wherein processing each of a plurality of records in the second directory as a current record in the second directory further includes storing the now checksum for the current record in the second directory.

14. The method of claim 12, wherein the record in the first directory is changed to be consistent with the current record in the second directory only upon determining that an update sequence number associated with the record in the first directory is less than or equal to a corresponding update sequence number for a last time the first directory was synchronized to the second directory.

15. The method of claim 12, wherein locating a record in the first directory corresponding to the current record in the second directory comprises:

- locating the record in the fast directory by a distinguished name of the record within a hierarchy of one or more sub-directories; and,
- upon failing to locate the record in the first; directory by the distinguished name of the record, locating the record in the first directory by referencing an identifier for the record in the first directory within a table mapping an identifier for the record in the second directory to the identifier for the record in the first directory.

16. The method of claim 12, wherein the method is performed by execution of a computer program stored on a machine-readable medium by a processor.

17. A system comprising:

- a first directory stored on a computer-readable medium, the first directory having an update sequence number capability, where a change in the first directory is associated with a unique, consecutively incremented update sequence number;
- a second directory stored on a computer-readable medium; and,
- a synchronization logic to synchronize the first directory and the second directory, the logic being computer-executable instructions stored on a computer-readable medium, when such instructions are executed by a computer, the logic having at least one synchronization capability selected from a group of synchronization capabilities essentially consisting of:
- a dampening capability, utilizing the update sequence number capability of the first directory, to prevent changes originating from the second directory already synchronized to the first directory from being synchronized back to the second directory as changes originating from the first directory;
- an identifier mapping capability, utilizing a table mapping a unique identifier of each of a plurality of records of the first directory with a unique identifier of a corresponding record of a plurality of records of the second directory, to track moved records within the first and the second directories; and,
- a checksum capability, utilizing a checksum for each of the plurality of records in the second directory, to allow efficient detection of chances in the second directory, where the use of checksum is the only mechanism for efficiently detecting the changes in the second directory, where the changes can include deletions.

18. The system of claim 17, wherein the synchronization logic prevents changes in the second directory from being synchronized to the first directory where changes in corresponding records have already been made in the first directory.

19. The system of claim 17, wherein the logic is stored as a computer program on a machine-readable medium for execution by a processor.

20. The system of claim 17, wherein each of the plurality of records in the first directory and the second directory is an object.

* * * * *

UNITED STATES PATENT AND TRADEMARK OFFICE
CERTIFICATE OF CORRECTION

PATENT NO. : 6,581,074 B1
DATED : June 17, 2003
INVENTOR(S) : Wong et al.

It is certified that error appears in the above-identified patent and that said Letters Patent is hereby corrected as shown below:

<u>Column 1,</u>
Line 10, replace "refereed" with -- referred --.

<u>Column 3,</u>
Line 59, replace "200" with -- 100 --.

<u>Column 4,</u>
Line 15, replace "refereed" with -- referred --.

<u>Column 8,</u>
Line 3, replace "straw" with -- arrow --.
Line 24, replace "104b"" with -- 100b --.
Lines 50 and 51, replace "pota-tions" with -- notations --.

<u>Column 10,</u>
Line 61, replace "define" with -- defined --.

<u>Column 11,</u>
Line 49, replace "100b. In the" with -- 100b in the --.

<u>Column 12,</u>
Line 49, replace "though" with -- through --.

<u>Column 13,</u>
Line 4, replace "doves" with -- drives --.
Line 39, replace "computerizes" with -- computerized --.

UNITED STATES PATENT AND TRADEMARK OFFICE
CERTIFICATE OF CORRECTION

PATENT NO.    : 6,581,074 B1
DATED         : June 17, 2003
INVENTOR(S)   : Wong et al.

It is certified that error appears in the above-identified patent and that said Letters Patent is hereby corrected as shown below:

Column 15,
Line 31, replace "now" with -- new --.
Line 42, replace "fast" with -- first --.

Signed and Sealed this

Thirtieth Day of September, 2003

JAMES E. ROGAN
*Director of the United States Patent and Trademark Office*